United States Patent
Daly et al.

(10) Patent No.: US 7,723,410 B2
(45) Date of Patent: May 25, 2010

(54) ACRYLIC COATING POWDERS COMPRISING HYDROPHOBIC PARTICLES AND POWDER COATINGS THEREFROM HAVING IMPROVED FILIFORM CORROSION RESISTANCE

(75) Inventors: Andrew T. Daly, Sinking Spring, PA (US); Sabine Molitor-Limberg, Eslohe (DE)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 12/152,408

(22) Filed: May 14, 2008

(65) Prior Publication Data

US 2009/0192247 A1    Jul. 30, 2009

Related U.S. Application Data

(60) Provisional application No. 61/062,713, filed on Jan. 29, 2008.

(51) Int. Cl.
  *C08G 18/48*    (2006.01)
(52) U.S. Cl. ..................... 524/130; 525/208
(58) Field of Classification Search ................ 524/130
  See application file for complete search history.

(56) References Cited

U.S. PATENT DOCUMENTS

| | | | |
|---|---|---|---|
| 3,752,870 A | 8/1973 | Labana | |
| 3,787,340 A | 1/1974 | Labana et al | |
| 5,212,245 A | 5/1993 | Franks et al. | |
| 5,422,396 A | 6/1995 | Daly et al. | |
| 5,453,295 A * | 9/1995 | Sammel et al. | 427/195 |
| 5,635,548 A | 6/1997 | Kittle et al. | |
| 5,905,104 A | 5/1999 | Eklund et al. | |
| 6,046,276 A | 4/2000 | Ambrose et al. | |
| 6,228,927 B1 | 5/2001 | Lucarelli et al. | |
| 6,833,185 B2 | 12/2004 | Zhu et al. | |
| 6,844,397 B2 * | 1/2005 | Seike et al. | 525/208 |
| 2003/0077469 A1 | 4/2003 | Chasser et al. | |
| 2007/0078235 A1 | 4/2007 | Lu et al. | |

FOREIGN PATENT DOCUMENTS

EP    0 493 076 A2    7/1992

OTHER PUBLICATIONS

Product Information, AEROSIL R 972.*
Evonik, Aerosil and Aeroxide Fumed Metal Oxides for Powder Coatings, Nov. 2007.*
Database Caplus (Online), Chemical Abstracts Service, Columbus,OH,US:1989, Fujimori,Y. et al; XP002529194 Database access No. 1989:448121 & JPN.Kokai Tokkyo Koho,1989, p. 1-5.

* cited by examiner

*Primary Examiner*—Vasu Jagannathan
*Assistant Examiner*—Doris L Lee
(74) *Attorney, Agent, or Firm*—Andrew E. C. Merriam

(57) ABSTRACT

The present invention provides coating powder compositions for making filiform corrosion resistant coatings, the compositions comprising particles or agglomerates which include, intimately mixed, each of one or more thermosetting acrylic copolymer, one or more crosslinker for the acrylic copolymer and one or more hydrophobic submicron particle additive, wherein the hydrophobic submicron particle additive comprises from 0.01 to 1.5 wt. %, based on the total weight of the coating powder. The hydrophobic submicron particle additive comprises a submicron inorganic oxide, e.g. fume silica or a metal oxide, and one or more organosilicon compound, e.g. polydimethylsiloxane. In addition, the invention provides filiform corrosion resistant clear coat or tinted clear coat powder coatings on metal, e.g. aluminum wheels or forged alloy substrates.

9 Claims, No Drawings

ACRYLIC COATING POWDERS COMPRISING HYDROPHOBIC PARTICLES AND POWDER COATINGS THEREFROM HAVING IMPROVED FILIFORM CORROSION RESISTANCE

This application claims priority to U.S. Provisional Application 61/062,713 filed Jan. 29, 2008.

The present invention relates to thermosetting acrylic resin coating powders comprising submicron hydrophobic particles and to filiform corrosion resistant coatings made therefrom. More particularly, it relates to coating powders comprising one or more epoxy, carboxylic acid and/or phosphorus acid functional acrylic copolymer and one or more hydrophobic submicron particle, such as a hydrophobic silica, as well as to the filiform corrosion resistant coatings made therefrom, e.g. coated aluminum or forged alloy wheels.

The exposed portions of metal wheels on a speeding car are subjected to a fury of grit which abrades the protective coating. A hard and tough film is needed. The film should ideally be non-porous and should retain superior adhesion to the metal to prevent the spread of corrosion at the interface of the film and metal. However, the appearance of filiform corrosion precedes any evidence of degradation, e.g. visible pitting of the coating reaching down to the metal surface of the organic coating, is not necessary for the growth of filiform corrosion. For example, protective acrylic and polyester clear coat powder coatings have been used in comparable film thicknesses on aluminum wheels before this invention. Such coatings have been observed to fail to prevent filiform corrosion over time even though the coating itself had not suffered visually unacceptable degradation.

Currently, clear coats applied on aluminum wheels are applied over a nonchrome pretreatment, such as a single atom monolayer (SAM) pretreatment, which retains the bright color of the aluminum wheel. Such pre-treatments avoid highly toxic hexavalent chromium pretreatments; however, aluminum wheels having acrylic powder coating clear coats fail to give adequate filiform corrosion resistance.

Polyester clear coat powder coatings on hexavalent chromium-free pre-treated aluminum wheels and trim provide adequate filiform corrosion resistance. However, polyester powder coatings must be overlaid with a liquid to provide adequate chemical resistance, scratch resistance and weatherability.

Acrylic clear coat powder coatings on hexavalent chromium-free pre-treated aluminum wheels and trim provide desired chemical resistance, scratch resistance and weatherability; however, they fail to provide adequate filiform corrosion resistance, thereby resulting in unacceptable coating rejection rates.

U.S. patent publication no. 2003/0077469A1, to Chasser et al., discloses coating powders from acrylic, polyester or urethane polymers, along with a curing agent and a substituted phenolic anti-oxidant compound. The Chasser powders attempt to provide powder coatings on aluminum wheels exhibiting improved filiform coating resistance. However, Chasser regards the performance of polyester and acrylic powder powder coatings as equivalent. Further, Chasser fails to evaluate its coatings for clarity, weatherability and chemical resistance. Because the coatings in Examples 1-8 of Chasser were made from polyester, they would not be expected to provide adequate weatherability and chemical resistance. Still further, Chasser fails to disclose desired filiform corrosion resistance in powder coatings over aluminum substrates pretreated with hexavalent chromium-free pretreatments.

The present inventors seek to solve the problem of providing acrylic coating powders for making filiform corrosion resistant powder coatings for aluminum, forged alloy or metal substrates without impairing powder coating smoothness, chemical resistance, weatherability, and clarity, especially in powder coatings for aluminum or forged alloy wheels and automotive trim pretreated with hexavalent chromium-free pretreatments.

STATEMENT OF THE INVENTION

In accordance with the present invention, acrylic coating powders providing improved filiform corrosion in clear coat or tinted clear coat powder coatings comprise particles or agglomerates which include each of one or more thermosetting acrylic copolymer, one or more crosslinker for the acrylic copolymer, and from 0.01 to 1.5 wt. %, based on the total weight of the coating powder, of one or more hydrophobic submicron particle additive. The hydrophobic submicron particle additive is intimately mixed into the coating powder composition. Preferably, the one or more acrylic copolymer comprises an epoxy functional acrylic copolymer. The coating powders may comprise from 5 to 35 wt. % of crosslinker, based on the total weight of the coating powder. Further, the coating powders may comprise one or more epoxy or isocyanate functional adhesion promoter.

The hydrophobic submicron particle comprises an inorganic oxide and one or more organosilicon compound, such as, for example, an oligoorganosilicon compound, a polyorganosilicon compound, and mixtures thereof. Preferably, the organosilicon compound is substantially free of resin reactive groups, i.e. epoxy, carboxylic acid, mineral acid, amine, isocyanate, vinyl or acrylic groups. Examples of preferred organosilicon compounds include, for example, polydimethyl siloxane (PDMS), oligodimethyl siloxane, polymethylphenyl siloxane and oligomethylphenyl siloxane. Alternatively, the organosilicon can comprise from 0.01 to 7.5 wt. % of a silanol (SiOH) group. Suitable inorganic oxide particles, e.g. fume silica, comprise particles or agglomerates that have a total average particle size of from 0.001 µm (1 nanometer) to 1.0 µm, or, 0.004 µm or more, preferably, 0.25 micron or less, and, more preferably, 0.1 µm or less. Preferably, the inorganic oxide comprises a metal oxide, e.g. alumina, or fume silica.

In addition, according to the present invention, powder coated metal, e.g. aluminum or forged alloy substrates, comprise a coating made from the coating powder of the present invention. Preferably, the aluminum or forged alloy substrate is cleaned and pre-treated, for example with zinc phosphate or iron phosphate pretreatments. Substrates may include, for example, aluminum wheels and automotive trim.

All phrases comprising parenthesis denote either or both of the included parenthetical matter and its absence. For example, the phrase "(co)polymer" includes, in the alternative, polymer, copolymer and mixtures thereof.

Unless otherwise noted, all processes refer to and all examples were performed under conditions of standard temperature and pressure (STP).

All ranges cited herein are inclusive and combinable. For example, if an ingredient may be present in amounts of 0.05 wt. % or more to 1.0 wt. %, and in amounts up to 0.5 wt. %, then that ingredient may be present in amounts of from 0.05 to 1.0 wt. %, from 0.5 to 1.0 wt. % or from 0.05 to 0.5 wt. %.

As used herein, the term "average particle size" shall mean, unless otherwise indicated, the particle diameter or the largest dimension of a particle in a distribution of particles as determined by laser light scattering using a Malvern Mastersizer™

2000 instrument (Malvern Instruments Inc., Southboro, Mass.) per manufacturer's recommended procedures.

As used herein, the phrase "coating powder" refers to a powder coating composition and the phrase "powder coating" refers to a coating formed from a powder coating composition.

As used herein, the term "copolymer" shall mean any polymer made from two or more different monomers.

As used herein, unless otherwise indicated, the term "glass transition temperature" or "$T_g$" of any resin or (co)polymer is measured using differential scanning calorimetry (DSC) (rate of heating of 20° C. per minute), the $T_g$ being taken at the midpoint of the inflection. $T_g$ may alternatively be calculated as described by Fox in *Bull. Amer. Physics. Soc.*, 1, 3, page 123 (1956).

As used herein, the term "hybrid" of any (co)polymer or resin shall refer to adducts, grafts or block copolymers and compatible or compatibilized blends of such (co)polymers or resins, such as epoxy polyester hybrids.

As used herein, the term "intimate mixing" refers to any method by which the polymer or resin and additives, e.g. crosslinkers and pigments, are combined to form a particulate or agglomerate coating powder composition, including melt mixing, extrusion, microwelding or particle bonding, and granulation.

As used herein, the term "mass solubility" refers to the calculated solubility in water of a given material determined using the Advanced Chemistry Development (ACD/Labs) Software V9.04 (©1994-2007 ACD/Labs), and is available in the Chemical Abstracts' Registry.

As used herein, the term "(meth)acrylate" refers to either acrylate or methacrylate and the term "(meth)acrylic" refers to either acrylic or methacrylic.

As used herein, unless otherwise indicated, the term "molecular weight" refers to the weight average molecular weight of a polymer as measured by gel permeation chromatography (GPC) calibrated with polystyrene standards.

As used herein, the term "nonionic comonomer" refers to monomers that do not have acidic groups or salts, basic groups or salts, polyahl groups (e.g. OH, SH, NH), or condensation crosslinking groups.

As used herein, the term "oligoorganosiloxane" includes any number from 2 to 20 siloxane units and the prefix "polyorganosiloxane" includes more than 20 siloxane units.

As used herein, the term "phosphorus acid group" refers to a phosphorus oxo acid having a POH moiety in which the hydrogen atom is ionizable. Also included in the term "phosphorus acid group" are salts of the phosphorus oxo acid, i.e. that have a cation such as a metal ion or an ammonium ion replacing at least one acid proton. Examples of phosphorus acid groups include groups formed from phosphinic acid, phosphonic acid, phosphoric acid, pyrophosphinic acid, pyrophosphoric acid, partial esters thereof, and salts thereof.

As used herein, the term "phr" means the amount, by weight, of an ingredient per hundred parts, by weight, of the resin system. The resin system includes resin or polymer and crosslinking or curing agent.

As used herein, the term "polymer" includes random, block, segmented and graft copolymers, and any mixture or combination thereof.

As used herein, the terms "resin" and "polymer" are interchangeable.

As used herein, the term "resin system" refers to the total of epoxy resin, toughening resin and any crosslinker, curing agent or hardener (but not catalyst) which becomes an integral part of the cross-linked structure.

As used herein, the term "substantially free of resin reactive groups" refers to a molecule or compound that has less than 0.1 wt. % of a group that reacts with the acrylic copolymer of the present invention in or as a result of processing and/or curing, based on the total weight of the molecule or compound.

As used herein, the term "wt. %" refers to weight %.

Herein, unless otherwise noted, all percentages are by weight.

The coating powders of the present invention comprise particles that include therein each of one or more thermosetting acrylic copolymer and in the same particle one or more hydrophobic submicron particle additive. The inventive coating powders provide clear or tinted powder coatings exhibiting excellent filiform corrosion resistance on aluminum or forged alloy substrates, such as automotive wheel substrates, while using known coating application techniques and while using known acrylic copolymer resins that have until now produced powder coatings with unacceptably large filiform corrosion failure rates. Accordingly, the coating powders of the present invention can greatly reduce the proportion of wheels and trim rejected by customers for filiform corrosion without substantially increasing the cost of the coating powder or of its use. In addition, the coating powders of the present invention provide corrosion resistant coatings on iron, steel, magnesium alloy and brass substrates.

The one or more hydrophobic submicron particle comprises an inorganic oxide and an organosilicon compound, such as an oligoorganosiloxane compound or a polyorganosiloxane compound.

Suitable organosilicon compounds for making the hydrophobic submicron particle of the present invention may comprise polydiorganosiloxanes, polyorganosiloxanes, polydiorganosilazanes or polyorganosilazanes; organosilanes, e.g. octyl silane, diorganosilanes; organosilazanes, e.g. hexamethylene disilazane; organodisilazanes; oligomers of silanes e.g. pentamethyldisiloxane; organooligosilazanes, and mixtures thereof. As used herein, the term "organo" is defined by a $C_1$ to $C_{12}$ alkyl, cycloalkyl, (alkyl)aryl or phenyl group. Preferably, the organosilicon compound is polydimethylsiloxane, poly(methylphenyl)siloxane, or the condensation reaction product of a dihaloalkyl silane or a dihalodialkyl silane, i.e. an oligo- or poly-dialkylsiloxane.

Suitable inorganic oxide particles and agglomerates for making the hydrophobic submicron particle of the present invention may have an average particle size of from 0.004 μm (5 nanometer) to 1.0 μm, preferably, 0.2 micron or less, or, 0.1 μm or less, or, more preferably, 0.075 μm or less. The inorganic oxide may be silica, fume silica, metal oxides, such as aluminum oxides, zinc oxides, titanium oxides, and magnesium oxides; silicates, such as alkali metal silicates, and organic-inorganic oxide composites, such as the condensation reaction products or (di)alkoxy silanes with silica or silicates. Preferably, the one or more hydrophobic submicron particle is a treated fume silica, such as the condensation reaction product of dimethyidihalosilane treated fume silica.

Examples of suitable hydrophobic submicron particles include, for example, Fumed silica (heat) treated with dimethyldichlorosilane, such as those available in varying particle sizes as Aerosil™ R972 or Aerosil™ R974 or Aerosil™ R976 (Degussa Corporation, Parsippany N.J.), fumed silica treated with hexamethyldisilazane (HMDS), such as those available as Aerosil™ RX 50 (Degussa), silanized zinc oxides, such as those available as VP Ad Nano™ Z 805 (Degussa), pyrogenic aluminium oxide treated with octylsilane, such as any available as Alu C 805 Aeroxide™ (Degussa), dichlordimethylsilane modified pyrogenic silica, such as any available as Aeroxide™ LE2 (Degussa), highly dispersed hydrophobic titanium dioxides, such as any available as Aeroxide™ T 805 (Degussa), and hydrophobic fumed silicas, such as each of those available from Degussa as Aerosil™ R8200, Aerosil™ R9200 or Aerosil™ R504.

Suitable amounts of the one or more hydrophobic submicron particle in the coating powder composition range from 0.01 to 1.5 wt. %, based on the total weight of the coating powder, or up to 1.0 wt. % to insure coating clarity, or, more preferably, up to 0.5 wt. %, or, even more preferably, up to 0.3 wt. %. Preferably, the coating powder composition comprises 0.05 wt. % or more of the hydrophobic submicron particle.

To insure improved filiform corrosion resistance, the hydrophobic submicron particle is added to the coating powder before or during intimate mixing or resin particle agglomeration to form the coating powder and becomes part of the coating powder particle or agglomerate. In addition, a portion of the one or more hydrophobic submicron particle, not to exceed 95 wt. % of the total amount of hydrophobic submicron particle used, may be post-blended or dry blended, i.e. as separate particles, with the intimately admixed coating powder.

The one or more acrylic copolymer of the present invention has a glass transition temperature ($T_g$) of from 40° C. to 90° C., and, preferably, 50° C. or more. The one or more acrylic copolymer comprises the copolymerization reaction product of one or more epoxy, carboxylic acid or phosphorus acid functional monomer and one or more vinyl or acrylic comonomer, preferably a comonomer which would itself form a homopolymer having a glass transition temperature ($T_g$) of 25° C. to 175° C., or, more preferably, 50° C. or more. Retaining a suitable acrylic copolymer $T_g$ ensures adequate blocking resistance or package stability while retaining adequate flow and film-forming properties.

The one or more acrylic copolymer may be any chosen from epoxy functional acrylic copolymer having a $T_g$ of from 40° C. to 90° C., carboxylic acid functional acrylic copolymer having a $T_g$ of from 40° C. to 90° C., phosphorus acid functional acrylic copolymer having a $T_g$ of from 40° C. to 90° C., and mixtures and combinations thereof.

The one or more epoxy functional acrylic copolymer may comprise the copolymerization product of from 10 to 40 wt. %, based on the total monomers to be copolymerized, of one or more epoxy functional unsaturated monomer, e.g. glycidyl (meth)acrylate, and one or more vinyl or acrylic comonomer, preferably a comonomer which would itself form a homopolymer having a glass transition temperature ($T_g$) of 25° C. to 175° C. If the amount of the epoxy functional unsaturated monomer used is less than 10 wt. %, based on the total weight of copolymerized monomers, it does not measurably contribute to an improvement of solvent resistance and mechanical strength. On the other hand, if the amount exceeds 40% by weight, no additional improvement in corrosion resistance is obtained.

The one or more carboxylic acid functional acrylic copolymer may comprise any copolymer having a weight average molecular weight of between about 1000 and about 30,000, and a carboxylic acid equivalent weight of from about 300 to about 1000, preferably at least about 500, the copolymerization product of from 2.5 to 25 wt. %, based on the total weight of copolymerized monomers, of one or more α-β ethylenically unsaturated carboxylic acid, and one or more vinyl or acrylic comonomer, preferably a comonomer that would itself form a homopolymer having a glass transition temperature ($T_g$) of 25° C. to 175° C. Suitable carboxylic acid functional acrylic copolymers may include, for example, Joncryl 819 and Joncryl 821 from BASF Corporation, Wyandotte, Mich.

The one or more phosphorus acid functional acrylic copolymer may comprise the copolymerization product of from 0.5 to 10 wt. %, preferably, 1 to 5 wt. %, based on the total weight of copolymerized monomers, of one or more phosphorus acid monomer, and of one or more vinyl or acrylic comonomer, preferably, a comonomer which would itself form a homopolymer having a glass transition temperature ($T_g$) of 25° C. to 175° C. The phosphorus acid functional acrylic copolymer may further comprise the copolymerization product of up to 10 wt. %, preferably, from 1 to 5 wt. %, based on the total weight of copolymerized monomers, of one or more α-β ethylenically unsaturated carboxylic acid. The acrylic copolymer may comprise mixtures of one or more phosphorus acid functional acrylic copolymer and one or more epoxy functional acrylic copolymer.

Suitable epoxy functional unsaturated monomers may include, for example, one or more glycidyl ester of α-β ethylenically unsaturated carboxylic acids, such as (meth) acrylic, maleic or itaconic acid, and allyl glycidyl ethers. Preferably, the epoxy functional monomer is chosen from glycidyl(meth)acrylate monomers of the formula $H_2C=C(R^8)C(O)OR^9$, wherein $R^8$ is H or a lower alkyl group and $R^9$ is a glycidyl terminal, branched or unbranched alkylene residue containing from 1 to 4 carbon atoms, i.e. the glycidyl ring lies at the end distal to the unsaturation. Illustrative compounds within the definition of the formula are glycidyl acrylate, glycidyl(meth)acrylate, and 1,2- epoxybutylacrylate, preferably, glycidyl(meth)acrylate of formula, wherein $R^8$ is methyl and $R^9$ is a glycidyl methylene group. Glycidyl(meth) acrylate monomers may comprise a mixture of monomers of formula I. Glycidyl(meth)acrylate, can be obtained commercially from Eastman Chemical Co. (Calvert City, Ky.) or it can be prepared under reaction conditions known to those of skill in the art.

Suitable α-β ethylenically unsaturated carboxylic acid monomers may include, for example, acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof.

Suitable phosphorus acid monomers can be any α-β ethylenically unsaturated monomer having a phosphorus acid group and may be in the acid form or as the salt of the phosphorus acid group. Phosphorus acid monomers may include, for example, phosphoalkyl(meth)acrylates such as phosphoethyl(meth)acrylate, phosphopropyl(meth)acrylate, and phosphobutyl(meth)acrylate, phosphoalkyl crotonates, phosphoalkyl maleates, phosphoalkyl fumarates, phosphodialkyl(meth)acrylates, phosphodialkyl crotonates, vinyl phosphates, and (meth)allyl phosphate. Preferred are phosphoalkyl methacrylates. Other suitable phosphorus acid monomers may include dihydrogen phosphate-functional monomers such as allyl phosphate, mono-or diphosphate of bis(hydroxy-methyl)fumarate or itaconate; phosphonate functional monomers, including, for example, vinyl phosphonic acid, allyl phosphonic acid, 2-acrylamido-2-methylpropanephosphonic acid, α-phosphonostyrene, 2-methylacrylamido-2-methylpropanephosphonic acid; 1,2-ethylenically unsaturated (hydroxy)phosphinylalkyl(meth) acrylate monomers; and oligomeric phosphorus acid monomers, such as diphosphomonoalkyl(meth)acrylates, i.e. (meth)acryloyloxyalkyl diphosphate, triphosphomonoalkyl (meth)acrylates, metaphosphomonoalkyl(meth)acrylates and polyphosphomonoalkyl(meth)acrylates.

In another embodiment, the phosphorus acid functional acrylic copolymer may be prepared by first preparing a precursor polymer which contains a pendant first co-reactive epoxy group which can be reacted with a compound containing a second co-reactive group and a phosphorus acid group. For example one can prepare a precursor polymer using glycidyl(meth)acrylate. Suitable second co-reactive groups on the compound including a second co-reactive group and phosphorus acid group are amine, hydroxyl, and phosphoric acid anhydride. An epoxy functional precursor polymer can be reacted with polyphosphoric acid, or glyphosate to generate a phosphorus acid functional acrylic copolymer with internal pendant phosphorus acid groups.

Suitable comonomers may include, for example, one or more nonionic acrylic, vinyl or allyl monomer chosen from alkyl(meth)acrylates, cycloalkyl(meth)acrylates, alkyl aryl (meth)acrylates, vinyl esters, alkyl vinyl ethers, (meth)acrylonitriles, (meth)acrylamides, dialkyl esters of unsaturated dibasic acids, and mixtures thereof. Suitable examples of an acrylic comonomer may be, for example, a $C_1$ to $C_{20}$ (cyclo) alkyl ester of (meth)acrylic acid, such as methyl(meth)acrylate, ethyl(meth)acrylate, n-butyl(meth)acrylate, isobutyl (meth)acrylate, and t-butyl(meth)acrylate, 2-ethylhexyl (meth)acrylate, cyclohexyl(meth)acrylate, lauryl(meth) acrylate, stearyl(meth)acrylate, dicyclopentadienyl(meth) acrylate, norbornyl(meth)acrylate, isobornyl(meth)acrylate, higher alkyl esters of (meth)acrylic acid, such as eicosyl (meth)acrylate, cetyl(meth)acrylate, tridecyl(meth)acrylate, and mixtures thereof; benzyl(meth)acrylate and phenyl (meth)acrylate. Suitable vinyl comonomers may include, for example, styrene, α-methyl styrene, α-ethylstyrene, vinyl toluene, divinyl benzene, vinyl esters, e.g. vinyl acetates, vinyl ethers, allyl ethers, allyl alcohols, and mixtures thereof. Preferably, the comonomer comprises one or more $C_1$ to $C_8$ (cyclo)alkyl ester of (meth)acrylic acid, such as methyl methacrylate, 2-ethylhexyl methacrylate, and isobutyl acrylate.

Suitable mixtures of acrylic copolymers may comprise one or more epoxy functional acrylic copolymer mixed with one or more acrylic copolymer chosen from carboxylic acid functional acrylic copolymers, phosphorus acid functional acrylic copolymers, and epoxy functional acrylic copolymers.

The acrylic copolymers may be formed by conventional polymerization methods in the presence of a thermal or redox initiator. Organic solvent polymerization is performed in the case of epoxy functional acrylic copolymers. In other cases, aqueous emulsion polymerization may be performed.

The coating powders further comprise from 5 to 35 wt. %, based on the total weight of the coating powder, of one or more crosslinker. The crosslinker is added in a stiochiometry of 0.75:1 to 1.25:1 acid to epoxy, preferably 0.95 to 1.05:1. Such crosslinkers may include any that react with epoxy groups. Preferred crosslinkers for epoxy functional acrylic polymers may include organic dicarboxylic acids and their anhydrides such as sebacic acid, dodecanedioic acid, and adducts made from esterification of organic dicarboxylic acids or anhydrides with polyesters. The preferred crosslinkers add to coating flexibility and may enhance chip resistance. Crosslinkers for carboxylic acid functional acrylic copolymer or phosphorus acid functional acrylic copolymer coating powders may comprise a polyepoxy crosslinker, such as triglycidyl isocyanurate (TGIC), bisphenol A epoxy resins, or epoxy phenol novolak.

The adhesion promoter may additionally comprise an epoxy resin or isocyanate compound or prepolymer adhesion promoter having a $T_g$ of 40° C. or higher, such as, for example, epoxy resins, epoxy-phenolic novolak resins; dimers and trimers of isophorone diisocyanate (IPDI), hexamethylene diisocyanate (HMDI) or toluene diisocyanate, blocked isocyanates, such as caprolactam blocked IPDI, and isocyanate terminated prepolymers of diisocyanates or their dimers or trimers with a polyol or glycol. Preferred adhesion promoters are bisphenol epoxy resins, more preferably bisphenol A or bisphenol F epoxy resins. The presence of an epoxy adhesion promoter can improve CASS (copper accelerated salt spray) corrosion resistance versus the same powder without the adhesion promoter. Suitable amounts of adhesion promoter may range up to 10 wt. %, based on the total weight of the coating powder, preferably from 0.2 to 3 wt. %, or, more preferably, up to 1 wt. %. Amounts of greater than 3 wt. % can contribute to weatherability problems.

The coating powder compositions may further incorporate minor amounts of other components known in the art including, for example, from 0.1 to 15 phr, preferably up to 5 phr of one or more ultraviolet light stabilizer or light absorber to aid in weatherability. Suitable light stabilizers include, for example, hindered amines, such as dimethyl succinate polymer with 4-hydroxy tetramethyl piperidine ethanol, hindered phenols or combinations comprising at least one of the foregoing light stabilizers.

Hydrolyzable silanes, e.g. alkoxysilanes, may be used in the amount of from 0.01 to 3 wt. %, preferably, 0.3 wt. % or less, based on the total weight of the coating powder to couple the hydrophobic submicron particle into the coating matrix. Examples of suitable silanes include glycidyl alkoxy silanes and amino alkoxy silanes, such as glycidyl trimethoxy silane.

Small amounts, e.g. up to 0.10 wt. %, based on the total weight of the coating powder, preferably, up to 0.05 wt. %, of organic pigments, such as phthalo-cyanines may be included to control yellowing. The coating powder may additionally comprise any of from 0.001 to 1.0 wt. %, based on the total weight of the coating powder, of optical brighteners and/or leveling agents; from 0.1 to 10 phr, based on the total weight of the coating powder, of one or more flatting agent, such as alkyl(meth)acrylate copolymers, up to 6 phr of one or more wax; and from 0.01 to 1.0 wt. %, based on the total weight of the coating powder, of post blend additives, such as dry flow additives like silica or fume alumina.

Coating powders of the present invention are produced according to conventional methods. The components may be blended, and then intimately mixed, such as, for example, by melt-compounding so that no significant curing occurs. A molten compound may be extruded then rapidly cooled, followed by grinding and, if necessary, sorting the particulates according to size. Alternatively, the coating powders may be produced by bonding the acrylic copolymer particles with hydrophobic submicron particles to form agglomerate particles.

The coating powders may be applied via conventional means. For electrostatic coating, the average size of the particles may range from 5 to 200 μm, preferably 25 μm or more, or, 75 μm or less.

Once applied the coatings are cured thermally, for example, at temperatures of from 90 to 250° C. for a period of from 30 seconds to 90 minutes. Heat for thermal cure may come from a convection, infrared (IR) or near IR source.

Suitable substrates may include, for example aluminum, forged alloys, iron, steel, magnesium alloy, such as electronic goods and brass, such as lock and door hardware. Aluminum substrates may include, for example, aluminum silicon alloys, aluminum lithium alloys, aluminum magnesium, aluminum zinc, aluminum manganese, aluminum copper base alloys such as aluminum bronze, and the like. The alloys may be single, binary, or have more than two metals.

Preferably, the substrates are pretreated. Aluminum and forged alloy substrates may be pretreated with, for example, a self-assembled monolayer of phosphorus organic material, zirconium titanates, or acrylic modified zirconium titanate. Steel and iron substrates may be pretreated with passivating agents, such as zinc phosphate or iron phosphate.

The following examples illustrate the utility of the present invention.

EXAMPLES

Test Methodology

Film Thickness: Dry film thickness was measured using a POSITECTOR™ Model 6000-FN1 Coating Thickness Gauge from DeFelsko Corporation, Ogdensburg, N.Y., the film thickness was measured according ASTM D 1400-00 "Standard Test Method for Nondestructive Measurement of Dry Film Thickness of Nonconductive Coatings Applied to a Nonferrous Metal Base", 2000. Film thickness is reported as the range (low to high) of three readings measured in the center portion of the panel.

Methyl Ethyl Ketone (MEK) Rub Resistance: A cotton-tipped applicator is saturated with MEK and rubbed a total of 50 double rubs back and forth across the surface of a test coating using approximately 2.6 cm strokes and 2-2.5 Kg of application pressure. One back and forth motion equals one double rub. The applicator shall remain saturated with MEK throughout the 50 double rubs. Coatings that display MEK resistance ratings from 4-5 are considered to have acceptable cure, physical properties and solvent resistance. The test panels are rated in Table 2, as follows:

TABLE 2

MEK Rating Chart

| MEK Rub Resistance Rating | Rub-Off | Indication of Chemical Resistance | Comments |
|---|---|---|---|
| 5 | None | Excellent | No rub-off of coating pigmentation; no softening or dulling of coating surface |
| 4 | Slight | Very Good | Slight rub-off of coating or pigmentation |
| 3 | Moderate | Fair to Good | Moderate rub-off of coating or pigmentation |
| 2 | Heavy | Poor to Fair | Heavy rub-off of coating or pigmentation |
| 1 | Extreme | Very Poor to None | Extreme rub-off of coating or pigmentation, or complete rub through coating to substrate |

Crack Crazing Resistance: To determine the relative resistance to crazing of a clear powder coating when exposed to isopropyl alcohol, the powder coated substrates were bent over a 165 degree mandrel. The resulting panels have a 30 to 45 degree bend from horizontal and isopropyl alcohol is applied on the coating at point of maximum curvature. Immediately thereafter, the treated area was observed for the formation of cracks. The point of reference for observing cracks was perpendicular to axis. One minute after the isopropyl alcohol is applied, the degree of cracking is visually observed and reported.

Crosshatch Adhesion: Coatings were tested in accordance with the adhesion test method published by the American Society For Testing And Materials (ASTM) using the method D3359-02, "Standard Test Methods for Measuring Adhesion by Tape Test", Test Method B—Cross-Cut Tape Test (2002). This method provides for cutting through the film in a cross-hatch pattern of specified spacing, and taping the cut area with Permacel #99 tape, and then rapidly removing the tape. The cut area is then inspected to determine if paint has been loosed or removed, and the area is given a rating.

A rating of 5B is a perfect rating, requiring that none of the coating be removed. A rating of 0B would indicate that 65% or more of the coating was removed, thereby showing poor adhesion of the coating to the substrate. The Minimum acceptable adhesion rating is 3B.

Chemical Testing: Reference Fuel B and Washer Fluid: On coated panels at room temperature, a cotton pad with the respective solvent(s) is placed on the surface for a specified time period with a crucible on top to hinder the evaporation rate. For the Reference Fuel B (70% isooctane and 30% toluene) Test, the cotton pad is placed on the substrate for 1 hour and is washed with DI water and dried with a paper towel. For the Washer Fluid Test (part. No. 8710320, Volvo original), a mixture of 50% methyl acetate and 50% ethanol on the cotton pad is placed on the substrate for 2 hours and is washed with DI water and dried with a paper towel. Evaluation takes place 24 hours after end of test. The surface of the coating film is evaluated for swelling on a rating from 0 to 3, with "0" being no indication of swelling and "3" being heavy swelling and evaluated for discoloration from 0 to 3, with "0" being no discoloration and "3" being heavy discoloration of the paint film. A "pass" means no changes in surface or softening. The coating is then subjected to an adhesion test. To pass the test, it should not be possible to remove the coating of the surface under test by scraping with the nail.

Copper Accelerated Acetic Acid Salt Spray (CASS) DIN ISO EN 9227 (October 2006): CASS Corrosion resistance testing of powder coatings was conducted by cutting in wheel sections, two scribes per section, at a distance min. 20 mm from each other with min 100 mm scribe length and 1 mm scribe width, with a Sikkens/Erichsen model 463 manual scribe tool, through the coating down to the metal substrate (Erichsen, Hemer, Germany), and placing maximum of 20 wheel sections in an accelerated salt spray chamber (Type SC 1000 salt spray tester, Weiss Umwelttechnik GmbH, Reiskirchen, DE), equipped with a filtered air pressurized atomizer having an acrylic glass nozzle and a deionized water saturation tower and adjusted to collect 1.5 ml/h±0.5 ml/h, per each 80 $cm^2$ area of the substrate wheel section, of a solution of 50±5 g/l sodium chloride (NaCl) and 0.26±0.02 g/l copper (II) chloride dihydrate ($CuCl_2.2H_2O$) in deionized water having a pH of from 3.1 to 3.3 (VIN 50021 CASS solution) at a temperature of 50° C.±2° C. for a period of 24 hours.

Filiform Corrosion Resistance (Panels):

To measure filiform corrosion resistance in coatings, on each panel a 1 mm scribe bisecting the coating was made through the coating down to the substrate with an Erichsen model 463 manual scribe tool, and the scribed coating was aged in the accelerated salt spray chamber using the salt spray solution used for CASS testing, described above, for a period 24 hours time at a temperature of 23° C. The length of all of the filaments in each panel were measured with a metric ruler. The average length of the filaments and the longest filament length of each panel is reported in Table 3, below.

Daimler DC Filiform Corrosion Resistance PPAP3002 (TA762) Procedure:

To measure filiform corrosion resistance in coated wheel sections, the DIN ISO EN 9227 CASS procedure, described above, was followed, with no rinse. The resulting specimens were then placed directly into 82% RH at 60° C. for 672 hours. The lengths of all of the filaments on each specimen were measured with a metric ruler and the average creepage (length of the filaments) and the maximum creepage (longest filament length) is reported in Table 3, below.

Appearance/Smoothness: This was rated by comparing the coatings with Powder Coatings Institute (PCI) standard panels, a score of 1 (poor) is rated as heavy orange peel and a 10 is the smoothest rating.

QUV-B: The initial gloss and color (calorimetric) of each coated panel was determined and then the panels were exposed to radiation at a mean wavelength of 313 nm for 3000 hours in a UV-B tester made by Pausch Messtechnik GmbH (Haan, Germany), followed by determination of final gloss and color change (Δe).

Examples 1 to 6

Formulation and Application

Coating powder was formed from the ingredients of Example 2 listed in the following Table 1 according to a method wherein the raw ingredients were blended in a Prism mixer for 30 seconds @2100 RPM, then extruded in a ZSK30 (Coperion Werner & Pfleiderer, Stuttgart, Germany) at 400 rpm, 15-30% torque and 90-130° C. barrel temperature setting. The resulting molten extruded mixture was fed through cooled chill-rolls to form a solid sheet that was subsequently granulated into chip form. Dry flow additives were mixed with the chips by bag shaking for 0.25-0.5 min. The post blend treated chips were then ground to a fine powder in a ZM 100 lab mill (Retsch, Wuppertal-Haan, DE) at 18.000 rpm using a 0.5 mm screen size screen. The resulting powder was screened through a 125 μm mesh size sieve and was applied to the indicated substrate using a Nordson Versa-spray™ Amherst Ohio electrostatic spray gun to the indicated thickness and was then cured at 175° C. for 20 min in electric heated lab oven to form powder coatings.

The coating powder of Example 1 was formed by simple melt mixing of the ingredients listed in the in a ZSK25 (Coperion Werner & Pfleiderer, Stuttgart, Germany) at 500 rpm, 15-30% torque and 90-130° C. barrel temperature setting. The resulting molten extruded mixture was fed through cooled chill-rolls to form a solid sheet that was subsequently granulated into chip form. Post blend (dry flow) additives were mixed with the chips by bag-shaking for 0.25-0.5 min. The post blend treated chips were then ground to a fine powder in a ZM 100 lab mill (Retsch, Wuppertal-Haan, DE) at 18.000 rpm using a 0.5 mm screen size screen. The resulting ground powder was screened through a 125 μm mesh size sieve for subsequent application to form coatings and was applied to the indicated substrate with a GEMA Optiflex-Optistar CG07 (St. Gallen, Switzerland) electrostatic spray gun to the indicated thickness and was then cured at 175° C. for 20 min in electric heated lab oven Heraeus UT60-6120 (Hanau, Germany).

TABLE 1

Formulations

| | EXAMPLE | |
|---|---|---|
| | 1 COMP | 2 |
| Raw Material | Amount (parts by weight) | |
| Acrylic copolymer 40 wt. % MMA; 23 wt. % BMA; 24 wt. % GMA; 13 wt. % Sty | 2250 | 2250 |
| Acrylic Copolymer 38 wt. % MMA; 11 wt. % BA; 23 wt. % GMA; 28 wt. % Sty | 750 | 750 |
| Sebacic Acid | 552.5 | 552.5 |
| [3]Acrylate copolymer flow modifier | 30 | 30 |
| [1]Benzoin | 15 | 15 |
| Dioxazine violet | 0.0018 | 0.0018 |
| [4]Benzotriazole | 15 | 15 |
| Dimethyl succinate polymer with 4-hydroxy tetramethyl piperidine ethanol | 15 | 15 |
| [2]Aerosil™ R-972 | — | 4 |
| [5]Bis phenol A epoxy | — | — |
| Glycidyl trimethoxy silane | 6 | 6 |
| Fumed aluminum oxide - Dry Flow | 0.20% | 0.20% |

[1]Benzoyl phenyl carbinol
[2]Aerosil™ R-972, Dimethyl Dichlorosilane treated fumed silica with approximately 70% of the surface hydroxyls are methylated Degussa Corp., Parsippany, NJ.
[3]Resiflow™ PL 200, Estron Chemical, Calvert City Kentucky.
[4]Tinuvin™ 928, Ciba Specialty Chemicals, Tarrytown, NY.
[5]Epikote™ GT 1003, Hexion Specialty Chemicals, Columbus, OH.

Application: The coating powders in Examples 1 to 2 were applied to each of wheel sections and panels: Wheel Sections: Non-chrome self-assembled monolayer (Gardobond™ X-4707 X-4661, Chemetall, Frankfurt a.M., DE) pre-treated, machined aluminum alloy (Ford spoke 7M2J-1007-AA (AlSi7Mgwa)) wheel sections comprised of aluminum doped with from 6.5 to 7.5% silicon, from 0.25 to 0.45 wt. % Mg, less than 0.10 wt. % Fe, less than 0.03 wt. % Cu; from 0.06 to 0.07 wt. % Zn, 0.14 wt. % Ti, and 0.02 wt. % Mn. Ford Motor Company, Dearborn, Mich. Panels: Gardobond™ X-4707 X-4661 pre-treated, 10.16 cm×15.24 cm (4"×6") AA6016 aluminum panels, available from Chemetall, Frankfurt a.M., DE. The coatings were cured for 15 minutes to achieve a substrate surface temperature of 190.6° C. (375° F.) to give coatings having thicknesses of 50-75 μm.

TABLE 3

Results

| | Example | |
|---|---|---|
| Test | 1 COMP | 2 |
| Film Thickness (mils) | 70-120 μm | 70-120 μm |
| MEK (50 dbr) | 4 | 5 |
| Craze Cracking | pass | pass |
| Crosshatch Adhesion | 5B | 5B |
| Crosshatch Adhesion After Recoat @ 4-5 mils | 5B | 5B |
| Chemical Testing - Reference Fuel B | 0 (no effect) | 0 (no effect) |
| Chemical Testing - Washer Fluid | 0 (no effect) | 0 (no effect) |
| Filiform (wheel sections): Max. creepage (mm) | 5.75 | |
| Filiform (wheel sections): Avg. creepage (mm) | 1.0 | |
| Filiform (panels): Max Creepage (mm)/Avg. Creepage (mm) | 4.0/1.5 | 1.0/0.2 |
| PCI Smoothness | 8 | 8 |
| QUV-B on panel (Gloss Retention %/Δe) | 63%/2.1 | |

As shown in filiform corrosion resistance testing, the inventive coating powders of Example 2 provides greatly improved filiform corrosion resistance in comparison to a known epoxy functional acrylic copolymer coating powder in Example 1 that does not comprise hydrophobic submicron particles of the present invention. At the same time, coatings made from the inventive coating powders retain the chemical resistance of the known coating powder, as shown by MEK rub resistance and Chemical Testing, and they retain the appearance and clarity properties of the known coating powder of Example 1.

What is claimed is:

1. A coating powder composition that provides a clear coat or tinted clear coat powder coating comprising particles or agglomerates which include each of one or more thermosetting acrylic copolymer, one or more crosslinker for the thermosetting acrylic copolymer, and one or more hydrophobic submicron particle additive, wherein the hydrophobic submicron particle additive comprises from 0.01 to 1.5 wt. %, based on the total weight of the coating powder wherein the hydrophobic submicron particle is intimately mixed with the copolymer to form the particle or agglomerate of the coating powder composition.

2. The coating powder as claimed in claim 1, wherein the hydrophobic submicron particle comprises an inorganic oxide and one or more organosilicon compound.

3. The coating powder as claimed in claim 2, wherein the inorganic oxide has an average particle size of from 0.001 μm to 1.0 μm.

4. The coating powder as claimed in claim 3, wherein the inorganic oxide is fume silica or a metal oxide.

5. The coating powder as claimed in claim 2, wherein the one or more organosilicon compound is substantially free of resin reactive groups.

6. The coating powder as claimed in claim 1, further comprising one or more epoxy or isocyanate functional adhesion promoter.

7. The coating powder as claimed in claim 1, wherein the one or more acrylic copolymer comprises an epoxy functional acrylic copolymer.

8. A coating on a metal substrate made from the coating powder as claimed in claim 1.

9. A coating as claimed in claim 8, wherein the substrate comprises aluminum or a forged alloy.

* * * * *